(12) United States Patent
Nercissiantz et al.

(10) Patent No.: US 8,829,092 B2
(45) Date of Patent: Sep. 9, 2014

(54) PROTECTIVE COATING COMPOSITION

(75) Inventors: Ara Z. Nercissiantz, Elsereno, CA (US); Gary M. Silvers, Mission Viejo, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 13/813,266

(22) PCT Filed: Aug. 22, 2011

(86) PCT No.: PCT/US2011/048543
§ 371 (c)(1),
(2), (4) Date: Jan. 30, 2013

(87) PCT Pub. No.: WO2012/027238
PCT Pub. Date: Mar. 1, 2012

(65) Prior Publication Data
US 2013/0143990 A1 Jun. 6, 2013

Related U.S. Application Data

(60) Provisional application No. 61/377,628, filed on Aug. 27, 2010.

(51) Int. Cl.
| | | |
|---|---|---|
| *C08K 5/5419* | (2006.01) | |
| *C09D 133/04* | (2006.01) | |
| *C09D 183/07* | (2006.01) | |
| *C09D 183/08* | (2006.01) | |
| *C09D 133/00* | (2006.01) | |
| *C09D 5/16* | (2006.01) | |
| *C08K 5/54* | (2006.01) | |
| *C08L 33/00* | (2006.01) | |
| *C08G 77/26* | (2006.01) | |

(52) U.S. Cl.
CPC ............... *C09D 133/00* (2013.01); *C08L 33/00* (2013.01); *C09D 183/08* (2013.01); *C09D 5/1675* (2013.01); *C08K 5/54* (2013.01); *C08G 77/26* (2013.01)
USPC ............................ 524/267; 525/100; 526/319

(58) Field of Classification Search
None
See application file for complete search history.

(56) References Cited

U.S. PATENT DOCUMENTS

| | | | | |
|---|---|---|---|---|
| 4,900,778 | A | | 2/1990 | Nagashima |
| 5,256,191 | A | * | 10/1993 | Thompson et al. ............ 523/161 |
| 5,261,951 | A | * | 11/1993 | Sejpka et al. ..................... 106/3 |
| 5,326,387 | A | | 7/1994 | Faber |
| 5,565,516 | A | * | 10/1996 | Fausnight et al. ............. 524/556 |
| 6,110,447 | A | | 8/2000 | Ramin |
| 6,221,433 | B1 | | 4/2001 | Muntz |
| 6,384,119 | B1 | | 5/2002 | Tye |
| 6,846,567 | B1 | | 1/2005 | Ekinaka |
| 7,288,282 | B2 | | 10/2007 | Graham |
| 7,318,937 | B2 | | 1/2008 | Jonn |
| 7,399,738 | B1 | | 7/2008 | Serobian |
| 7,562,966 | B2 | | 7/2009 | Silverbrook |
| 7,575,655 | B2 | | 8/2009 | Kuhn |
| 7,625,966 | B2 | | 12/2009 | Silvers |
| 2006/0211820 | A1 | | 9/2006 | Jonn |
| 2008/0114109 | A1 | | 5/2008 | Silvers |

OTHER PUBLICATIONS

International Search Report PCT/US2011/048543 Oct. 7, 2011, 4 pages.
"Shin-Etsu Silicone: Silicone Fluids: Modified Silicone Fluids—Dual-end type/Amino-modified (Reactive silicone fluids)" [retrieved from the internet on Mar. 19, 2012], URL <www.silicone.jp/e/products/type/oil/detail/search/deg17.shtml> 1 page.
"Shin-Etsu Silicone: Silicone Fluids: Modified Silicone Fluids—Side-chain type/Diamino-modified (Reactive silicone fluids)" [retrieved from the internet on Mar. 19, 2012], URL <www.silicone.jp/e/products/type/oil/detail/search/deg01.shtml> 1 page.
"Power Chemical Corporation—SiSiB® Silanes; SiSiB® P04100" [retrieved from the internet on Mar. 19, 2012] URL <www.powerchemical.net/4100.htm>, 2 pages.
"ChemBlink Online Database of Chemical from Around the World; Triethoxyoctylsilane" [retrieved from the internet on Mar. 19, 2012] URL <www.chemblink.com/products/2943-75-1.htm>, 2 pages.
"Hexamethyldisiloxane", Wikipedia, the free encyclopedia [retrieved from the internet on Jul. 23, 2010] URL <http://en.wikipedia.org/wiki/Hexamethyldisiloxane>, 1 page.
"Polydimethylsiloxane" Wikipedia, the free encyclopedia [last modified Jul. 15, 2010} [retrieved from the internet on Jul. 23, 2012] URL <http://en.wikipedia.org/wiki/Polydimethylsiloxane>, 5 pages.
"ISOPAR Paraffinic Solvents" Exxon (2007) 2 pages.
ShinEtsu Silicone, Textile Softener Bases KF877 KF8704 KF880 KF888, "Durable softness Slickness Low yellowing Wrincle recovery Lubricity" (2006) 4 pages.
"Silane Chemistry Primer" Dow Corning, (1995) 4 pages.
"Silicone Chemistry Overview" Dow Corning, (1997), (Article revised) was originally published in Chimie Nouvelle, vol. 8 (30), 847 (1990) by A. Colas from Dow Corning.
Xiameter from Dow Corning, "A Guide to Silane Solutions, The Basics of Silane Chemistry", (2009) 6 pages.
"Dow Corning® 20 Release Coating", Dow Corning Corporation Material Safety Data Sheet; Revision Date Feb. 9, 2012, 10 pages.
"SYL_OFF® 7677 COATING", Dow Corning Corporation Material Safety Data Sheet; Revision Date Apr. 8, 2011, 7 pages.
Release System Information Guide "SYL-Off® Solventless, Platinum-Catalyzed Hexenyl Silicone Release Coatings from Dow Corning" (2006) 12 pages.
"Dow Corning® 2-9118 Fluid" Dow Corning Corporation Material Safety Data Sheet, Revision Date Apr. 21, 2011, 8 pages.
"Dow Corning® 20 Release Coating", Product Information Release, Jul. 18, 2000, 2 pages.

(Continued)

*Primary Examiner* — Marc Zimmer
(74) *Attorney, Agent, or Firm* — Steven E. Skolnick; Philip P. Soo

(57) ABSTRACT

A protective coating composition comprises an acrylic resin, a reactive polyorganosiloxane or precursor therefor, hexamethyldisiloxane, and a solvent system. The coating composition may be applied to surfaces such as painted metal surfaces as may be found in motor vehicles.

20 Claims, No Drawings

(56) References Cited

OTHER PUBLICATIONS

Gubbels et al. E-Drive, "The Use of Silicone Materials in Close Proximity of Electrical Motors and Mechanical Relays", Dec. 2005/ Jan. 2006, vol. 6, Issue 6, 4 pages.
Dow Corning® 2-9118 Fluid, An ingredient for both automotive and household formulations, Product Information, (2001) 4 pages.
Singshine Industrial Chemicals; KH560 gamma-Glycidoxypropyltrimethoxysilane, [retrieved from the internet Jan. 30, 2013] URL <http://davidstern.en.ec21.com/KH560_Gamma_Glycidoxypropyltrimethoxysilane—3683527_3926039.html>, 2 pages.
Silquest A-1100 Product Description; Silquest A-1100 Silane; Momentive Performance Materials May 2010, 4 pgs.

* cited by examiner

US 8,829,092 B2

PROTECTIVE COATING COMPOSITION

BACKGROUND

Painted metal surfaces such as found in motor vehicles are ubiquitous. In normal use these surfaces are regularly exposed to weather effects such as rain, snow, sleet, ice formation, and other precipitation, as well as environmental contaminants (e.g., dirt, grime, dust, air-borne pollutants, road surface residue, bird and other animal waste, etc.). It is desirable to maintain the physical condition of these vehicles by cleaning or washing them and, in some cases, subsequently waxing and polishing or buffing them.

Many products that are intended to improve or restore a vehicle's finish are commercially available for these tasks. Products that are easy to use, that can impart an excellent appearance to the vehicle, and then can sustain that appearance, even after repeated or prolonged exposure to the weather or frequent vehicle cleaning and washing cycles, are especially valued.

U.S. Pat. No. 7,625,966, Anhydrous Protectant Chemical Composition to Silvers et al., is directed to a surface protectant composition for use on metal surfaces and, in some embodiments, includes one or more copolymers, a cosolvent, and hexamethyldisiloxane.

SUMMARY

In one embodiment, the invention provides a protective coating composition comprising an acrylic resin, a reactive polyorganosiloxane or precursor therefor, hexamethyldisiloxane, and a solvent system, wherein a drop of water dripped onto a panel in accordance with a water release test described herein (the panel having been coated with the protective coating composition) will run off the panel in 10 seconds or less. In some embodiments, the drop of water will run off the panel in 5 seconds or less.

In another embodiment, the invention provides a protective coating composition comprising an acrylic resin, a reactive polyorganosiloxane or precursor therefor, hexamethyldisiloxane, and a solvent system, wherein the protective coating composition, once having been applied to a painted metal panel of a motor vehicle at 70° F.±5° F. (21.1° C.±2.8° C.), will dry within about 3 to 5 minutes and then can be buffed by hand with a dry cloth to a clear, streak-free finish.

In yet another embodiment, the invention provides a protective coating composition comprising about 0.2% by weight to less than about 3.2% by weight of an acrylic resin (based on the weight of the protective coating composition), a reactive polyorganosiloxane or precursor therefor, hexamethyldisiloxane, and a solvent system.

The above summary is not intended to describe each embodiment or every implementation of the protective coating compositions described herein. Rather, a more complete understanding of the invention will become apparent and appreciated by reference to the following detailed description and claims.

DETAILED DESCRIPTION

As used herein and in the appended claims, the singular forms "a," "an," and "the" include plural referents unless the context clearly dictates otherwise. Thus, for example, reference to "a" or "the" component may include one or more of the components and equivalents thereof known to those skilled in the art. Moreover, "a," "an," "the," "at least one," and "one or more" are used interchangeably. "At least one" includes all numbers of one and greater (e.g., at least 2, at least 4, at least 6, at least 8, at least 10, at least 25, at least 50, at least 100, etc.). Reciting ranges by endpoints includes all numbers subsumed within that range (e.g., 1 to 10 includes 1.4, 1.9, 2.33, 5.75, 9.98, etc.). Further, the term "and/or" means one or all of the listed elements or a combination of any two or more of the listed elements. The term "comprises" and variations thereof do not have a limiting meaning where these terms appear in the accompanying description. When describing components of the protective coating composition, all references to weight % or % by weight are based on the weight of the protective coating composition.

Compositions according to the invention provide a protective coating to a surface to which they have been applied. In certain exemplary embodiments, the protective coating composition may impart an excellent appearance to a painted metal surface, such as the painted metal surface of a motor vehicle (e.g., an automobile, truck, motorcycle, etc.). Advantageously, such compositions may help to sustain that appearance even after the painted metal surfaces have had prolonged exposure to the weather or have been subjected to repeated cleaning and washing cycles.

Weather effects such as rain, snow, sleet, ice formation, and other precipitation can spoil the appearance of a painted metal surface such as found on a motor vehicle because, as the precipitation evaporates, it may trap dirt, grime, and other environmental contaminants and leave unsightly "water marks" or "water spots" on the painted metal surface.

In addition, routine motor vehicle maintenance ordinarily includes washing the vehicle with a mixture of water and detergent after which the vehicle is rinsed with water to remove accumulated environmental contaminants along with any detergent residue. Rinse water that remains behind on the surface that has been washed eventually evaporates but may leave "water marks" or "water spots" that have to be subsequently rubbed, buffed or polished in order to remove them. This is a time-consuming task, but one that vehicle owners may perform in order to impart a high-quality finish and appearance to the vehicle.

Certain exemplary embodiments of the protective coating compositions may promote excellent water-beading on a painted metal surface to which they have been applied. Such compositions encourage a large number of small, well-rounded, hemispherical water drops (whether resulting from exposure to precipitation or water used during ordinary washing and rinsing of the vehicle) to form or "bead up."These water drops will evaporate more quickly than a smaller number of larger, flatter water droplets that are more likely to form on a painted metal surface that has not been treated with a protective coating composition according to certain exemplary embodiments of the invention. Thus, a protective coating composition as described herein may promote faster drying of a painted metal surface that has been coated therewith and that subsequently becomes wet.

Certain exemplary embodiments of the protective coating compositions may facilitate the release of water from a painted metal surface to which they have been applied. This may enable the water to "run off" the painted metal surface more easily, thereby reducing the water marks or water spots that may have to be removed once any residual water evaporates.

In some embodiments, the protective coating compositions may yield a clear, streak-free, and in some variations a glass-like, finish on the painted metal surface of a motor vehicle that has been washed and rinsed, but without the need for substantial buffing of the surface. Desirably, the protective coating compositions may provide sufficient durability to maintain acceptable performance and a desired appearance even after the motor vehicle has been subjected to repeated washing and rinsing cycles.

Painted metal surfaces such as those found on motor vehicles may be regarded as having a highly desired, lustrous appearance if they are dark and glossy. Some exemplary embodiments of the protective coating compositions may facilitate maintaining a dark and glossy appearance on a painted metal surface to which they have been applied, and may resist fading or deterioration of that appearance that could occur as the painted surface is exposed to the weather or ages.

Among the air-borne pollutants and other environmental contaminants to which a painted metal surface may be exposed is "acid rain" (i.e., precipitation having an unusually acidic pH). The corrosive action of acid rain may accelerate the deterioration of a painted metal surface. Certain exemplary embodiments of the protective coating compositions described herein may offer enhanced protection against the corrosive effects of acid rain (e.g., staining and/or etching of the surface), may allow such effects to be more easily removed (e.g., by rinsing with water) if they do occur, and may help resist deterioration of the painted metal surface that might otherwise happen.

As mentioned above, sometimes it is desirable to maintain the physical condition of a motor vehicle by buffing or polishing it with suitable buffing compounds, waxes, polishes, glazes, and other beautifying agents after the vehicle has been washed and rinsed. Numerous tools have been developed to assist in these tasks such as powered rotary and dual-action buffers. However, in the hands of an inattentive or careless user, these tools could mar the painted surface of the motor vehicle and/or could generate sufficient heat to cause discoloration. Certain exemplary embodiments of the protective coating compositions described herein may offer enhanced protection against marring of a painted metal surface that might occur when using powered buffers or if exposed to high temperatures.

The protective coating compositions broadly comprise and, more preferably, consist essentially of, an acrylic resin, a reactive polyorganosiloxane or a precursor therefor, hexamethyldisiloxane, and a solvent system. The compositions tend to be clear liquids that have a water-like viscosity. In some embodiments the compositions may have a specific gravity of about 0.75 to 0.81 g/ml. The acrylic resin and the reactive polyorganosiloxane or a precursor therefor are present in the compositions as a physical blend.

The protective coating compositions are usually provided in a "one-part" form by which it is meant that a composition may be directly applied to a surface without first combining the composition with another co-reactive material. Advantageously, this permits the protective coating compositions to be easily applied by hand and in one-step. Certain exemplary embodiments of the protective coating compositions may be shelf-stable and/or insensitive to moisture thereby enabling them to be stored and used over an extended period of time without using special containers or adversely affecting performance.

Useful acrylic resins include polymers and copolymers of one or more (meth)acrylate monomers. (The expression "(meth)acrylate" means that both acrylate and methacrylate forms of the monomer are included.) Suitable (meth)acrylate monomers include those conforming to the structure

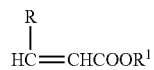

where R is H or —$CH_3$ (methyl) and $R^1$ is a straight-chain or branched alkyl group having 1 to 10 carbon atoms, although those monomers in which $R^1$ has fewer carbon atoms (e.g., 1 to 6 or 1 to 4 carbon atoms) may be preferred. Particular examples of useful (meth)acrylate monomers that may be polymerized alone or with other (meth)acrylate monomers include methyl(meth)acrylate, ethyl (meth)acrylate, n-propyl (meth)acrylate, iso-propyl(meth)acrylate, n-butyl(meth) acrylate, iso-butyl(meth)acrylate, t-butyl(meth)acrylate, and hexyl(meth)acrylate. The (meth)acrylate monomers may be optionally copolymerized with other compatible monomers such as styrene to yield, for example, a styrene (meth)acrylate copolymer and such are included within the scope of the acrylic resins that may be used.

Examples of commercially available acrylic resins that may be used include PARALOID B-67 and PARALOID B-67MT, each from Dow Chemical Company, Midland, Mich., U.S.A., and LUSTER SEAL 300, from The Euclid Chemical Company, Cleveland, Ohio, U.S.A.

As the amount of acrylic resin in the composition increases, the durability of the resulting protective coating may be acceptable, but the composition may be more difficult to apply to a surface (for example, it may be difficult to wipe off any excess composition or it may create undesirable streaks, rather than a clear, streak-free finish), and its ability to release water may decline. As the amount of acrylic resin in the protective coating composition decreases, the durability of the protective coating may suffer. As a result, a surface to which the protective coating composition has been applied may need to be subsequently treated more frequently in order to maintain the desired level of performance.

Within these parameters, a useful minimum amount of acrylic resin may be at least about 0.2 weight %, or may be at least about 0.23 weight %, or may be at least about 0.45 weight %. Also within these parameters, a useful maximum amount of acrylic resin may be less than about 3.2 weight %, or may be less than about 3 weight %, or may be less than about 2.3 weight %, or may be less than about 2 weight %. Suitable ranges for the amount of acrylic resin may be obtained by combining any of the useful minimum amount and maximum amount values noted above, for example, to yield a range of about 0.2 to 2.3 weight % acrylic resin. An acrylic resin amount of about 0.6 to 0.7 weight % is generally useful.

The protective coating compositions also include a reactive polyorganosiloxane although, in some embodiments as explained further below, this component may by partially or entirely replaced by a suitable precursor. A reactive polyorganosiloxane refers to a polyorganosiloxane (i.e., a polymer having a backbone structure of silicon and oxygen atoms, alternating in occurrence and repeating, with hydrocarbon moieties attached to the silicon atoms as side-groups and end-groups) wherein at least a portion of the hydrocarbon side-groups and/or end-groups have been replaced by or substituted with other organic functionality that can react with the surface to which the protective coating composition is applied.

The protective coating compositions described herein have particular utility with painted metal panels such as found in motor vehicles. Typically, these panels include a colored or pigmented base layer and an overlying, protective clear coat layer and references herein to painted metal panels such as found in motor vehicles means panels having such a construction. Conventional protective clear coat layers are formulated with acrylic, urethane or urethane-acrylic resins. Accordingly, the reactive organic functionality present in the reactive polyorganosiloxane may include groups capable of reacting with and bonding to an automotive clear coat or an acrylic, urethane, or urethane-acrylic surface. Suitable reactive organic groups for inclusion in the reactive polyorganosiloxane include acrylo groups, amine groups, epoxy groups, hydroxyl groups, mercapto groups, and methacrylo groups. Amine groups, including primary, secondary and/or tertiary amine groups, are useful.

Suitable reactive polyorganosiloxanes include reactive polydimethylsiloxanes which may conform to the following general structure

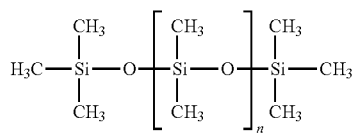

where "n" is an integer having a value of at least 1 and wherein one or more of the —$CH_3$ moieties is replaced by a side-group and/or an end-group that is or that includes a reactive organic group such as those mentioned above.

Examples of reactive polydimethylsiloxanes include amino-modified polydimethylsiloxanes, which refers to polydimethylsiloxanes wherein one or more of the —$CH_3$ moieties have been replaced by one or more side-groups and/or one or more end-groups that is or that includes a primary amine group, a secondary amine group, a tertiary amine group, or a mixture of primary, secondary and tertiary amine groups.

As noted above, the reactive polyorganosiloxane may be partially or entirely replaced in the composition by a suitable precursor, which refers to a material that may be converted into a reactive polyorganosiloxane, such as those described herein.

Reactive polyorganosiloxane precursors include oligomeric and partially polymerized versions of the reactive polyorganosiloxanes (e.g., polydimethylsiloxanes) described above that are capable of further polymerization.

Useful reactive polyorganosiloxane precursors also include organosilanes (monomeric silicone chemicals that contain at least one carbon-silicon bond) that can be converted into reactive polydimethylsiloxanes and other reactive polyorganosiloxanes such as described above. In general, organosilanes that contain hydroxyl functionality such that they can react with other hydroxyl-functional organosilanes (e.g., by condensation polymerization) to form reactive polydimethylsiloxanes and other reactive polyorganosiloxanes are useful. Other organosilanes that are suitable reactive polyorganosiloxane precursors are those that can hydrolyze in the presence of moisture with the resulting hydrolysis product(s) being capable of further reaction (e.g., by condensation polymerization) to yield reactive polydimethylsiloxanes and other reactive polyorganosiloxanes.

Organosilanes that may be employed as reactive polyorganosiloxane precursors in certain embodiments of the protective coating compositions include trialkoxy silanes such as trimethoxy and triethoxy silanes conforming to the following general structure $$R^3-Si(OR^2)_3$$

where $R^2$ is —$CH_3$ or —$CH_2CH_3$ and $R^3$ is an alkyl group optionally containing acryloxy-, methacryloxy-, glycidoxy-, or amino-functionality. Particular examples of such organosilanes include triethoxyoctylsilane, gamma-methacryloxypropyltrimethoxysilane, gamma-glycidoxypropyltrimethoxysilane, and gamma-aminopropyltriethoxysilane.

Other examples of organosilanes that may function as reactive polyorganosiloxane precursors include tetra(trialkylsiloxy)silanes such as those conforming to the following general structure $$Si(OSi(R^4)_3)_3$$

where each $R^4$ is an alkyl radical that may be the same or different. In one embodiment, each $R^4$ is —$CH_3$ so as to provide tetra(trimethylsiloxy)silane.

Commercial examples of organosilanes suitable as precursors that can yield reactive polyorganosiloxanes (e.g., polydimethylsiloxanes) include DOW CORNING 20 RELEASE COATING from Dow Corning Corporation, Midland, Mich., U.S.A., KF-859, KF-860, KF-8012, and SILICONE TEXTILE SOFTENER BASE KF-8704, each from Shin-Etsu Chemical Co., Ltd., Tokyo, Japan, and SILQUEST A-1110 SILANE from Momentive Performance Materials, Albany, N.Y., U.S.A.

As the amount of reactive polyorganosiloxane or precursor in the protective coating composition decreases, the water-beading properties of the coating composition may be less pronounced. In addition, the protective coating composition may be less able to release water from a surface to which the composition has been applied, may be less effective in reducing the formation of water marks or water spots, and may be less durable. On the other hand, as the amount of reactive polyorganosiloxane or precursor in the protective coating composition increases, the composition may be too oily, which can make it more difficult to easily apply and obtain a clear, streak-free finish on the coated surface.

Within these guidelines, a useful minimum amount of reactive polyorganosiloxane or precursor may be at least about 0.005 weight %, or may be at least about 0.02 weight %, or may be at least about 0.08 weight %. Also within these parameters, a useful maximum amount of reactive polyorganosiloxane or precursor may be less than about 0.1 weight %, or may be about 0.3 weight %, or may be about 0.4 weight %. Suitable ranges for the amount of reactive polyorganosiloxane or precursor may be obtained by combining any of the useful minimum amount and maximum amount values noted above, for example to yield a range of about 0.02 to 0.3 weight %.

Hexamethyldisiloxane (HMDS) is also a component of the protective coating composition. HMDS facilitates applying the protective coating composition to a surface and promotes obtaining a smooth, uniformly thick layer of the protective coating composition on the surface. As the amount of HMDS decreases, it may be more difficult to apply the protective coating composition so as to obtain a smooth, uniformly thick layer on a surface, and the time needed for the coating composition to dry may be longer than desired. As the amount of HMDS increases, solubility of other components of the protective coating composition may be adversely affected and the composition may not be as effective in releasing water from a surface to which the protective coating composition has been applied.

Within these guidelines, a useful minimum amount of HMDS may be greater than about 12 weight %, or may be at least about 18 weight %. Also within these parameters, a useful maximum amount of HMDS is less than 30 weight %, or may be less than about 28 weight %. Suitable ranges for the amount of HMDS may be obtained by combining any of the useful minimum amount and maximum amount values noted above, for example to yield a range of about 18 to 28 weight %. Using about 24 weight % HMDS is generally useful.

The protective coating compositions also include a suitable solvent system, which refers to combining two or more different solvents to impart the desired properties to the composition. Solvent combinations are selected to yield a lubricious protective coating composition that has good spreading characteristics, that can be easily wiped on to a surface, that does not evaporate too quickly or too slowly, and that permits excess coating composition to be removed without creating streaks that impair the appearance of the finished, coated surface, and that solubilize other components of the protective coating composition, especially the acrylic resin and the reactive polyorganosiloxane or precursor.

One class of useful solvents is isoparaffins; for example, oil-like, fully-saturated, linear and/or branched aliphatic hydrocarbons having around 9 to 13 carbon atoms and a flash point (as measured by ASTM D56) of about 100° F. to 270° F. (about 38° C. to 132° C.). Commercially available examples of acceptable isoparaffin solvents include many of the "ISO-PAR" series of solvents from ExxonMobil Chemical Company, Houston, Tex., U.S.A., especially ISOPAR G, ISOPAR L, ISOPAR M, and ISOPAR V.

If employed, the amount of isoparaffin solvent should be sufficient to prevent the protective coating composition from evaporating too quickly during application, which may cause the coating composition to have a streaky appearance or otherwise make it difficult to wipe off any excess composition. However, too much isoparaffin solvent may encourage other components in the protective coating composition to precipitate or may result in a composition that evaporates too slowly or that is difficult to apply.

Within these guidelines, the amount of isoparaffin solvent is generally more than 5 weight % and may be at least about 25 weight %, but generally it is less than 45 weight % and may be less than about 40 weight %. Suitable ranges for the amount of isoparaffin solvent may be obtained by combining any of the useful minimum amount and maximum amount values noted above, for example to yield a range of about 25 to 40 weight %.

Other useful solvents that may be employed in appropriate combinations include: acetone; short, straight- or branch-chained alcohols (e.g., ethanol, propanols, butanols, etc.); dipropyleneglycol monopropylether; and polysiloxane that has not substituted with organic groups that can react with the surface to which the protective coating composition is applied (e.g., polydimethylsiloxane and cyclosiloxanes such as hexamethylcyclotrisiloxane, octamethylcyclotetrasiloxane, decamethylcyclopentasiloxane, and dodecamethylcyclohexasiloxane). A mixture of acetone and isopropanol is useful.

As appropriate, other ingredients may be included in the protective coating compositions to impart desirable properties. For example, dyes or other colorants, perfumes, fragrances, trimethylated silica, flow controllers, leveling agents, viscosity modifiers, and other additives and adjuvants.

The protective coating compositions are easy to use. A small amount of coating composition is applied to the surface to be treated. For example, approximately 6 drops/ft² (65 drops/m²) may be used, depending on the condition of the surface being treated (weathered or deteriorated surfaces may benefit from using a larger amount of the protective coating composition). In one convenient approach, the coating composition may be evenly distributed on a surface in one step, by hand-wiping with a clean, dry cloth or pad (for example, a suede or microfiber cloth or a foam pad) using overlapping circular strokes. Excess composition may be wiped off and the composition on the coated surface allowed to dry. Preferably, the composition dries within an optimal time of 3 to 5 minutes under conditions of about 70° F.±5° F. (21.1° C.±2.8° C.) and 50%±3% relative humidity. Shorter or longer drying times are not particularly problematic, but may inconvenient for the user. The coated surface is then hand-buffed with a clean, dry cloth of cotton, synthetic or natural microfibers, or other suitable material using overlapping circular strokes. Certain embodiments generate a clear, streak-free, and in some cases, a glass-like, finish on the coated surface. Although not required, it is preferred that the protective coating composition cure for 20-60, preferably 45-60, minutes, under dry conditions.

The hydrophobic properties of protective coating compositions according to certain exemplary embodiments promote excellent water-beading on painted metal surfaces to which they have been applied, encouraging a large number of small, well-rounded, hemispherical water drops to form or "bead up." These will evaporate more quickly than a smaller number of larger, flatter water droplets that are more likely to form on painted metal surfaces that have not been treated with the protective coating composition. Thus, a protective coating composition as described herein may promote faster drying of a surface that has been coated therewith and that subsequently becomes wet.

Protective coatings compositions according to certain exemplary embodiments may also facilitate the release of water from surfaces to which they have been applied. Water applied to such a surface (for example, from precipitation or rinse water used to wash and clean a painted metal surface) will be readily released from or "run off" the surface, thereby reducing the water marks or water spots that may have to be removed once any water that remains on the coated surface evaporates. For example, water dripped onto a 4 inch by 4 inch (10.16 cm by 10.16 cm) section of a painted motor vehicle panel positioned at a 60° angle (the panel having been treated with certain embodiments of the protective coating composition) will run off that section of the panel in 6-10 seconds, or in 5 seconds or less.

Desirably, the protective coating compositions may provide sufficient durability to maintain acceptable performance and a desired appearance even after the coated surface has been subjected to repeated washing and rinsing cycles. For example, a painted motor vehicle panel that has been treated with certain embodiments of the protective coating composition may still promote excellent water-beading, encouraging a large number of small, well-rounded, hemispherical water drops to form or "bead up" even after more than 100 back-and-forth wiping motions (cycles) with a soft foam pad that has been saturated with a 5% aqueous automotive shampoo solution, or more than 200 cycles, or more than 250 cycles.

While the various embodiments have been particularly described in the context of painted metal panels such as found in motor vehicles, this is only by way of example and to facilitate understanding these embodiments. Certain embodiments could also be applied to surfaces other than painted metal panels such as bare metal panels, polymeric surfaces such as those derived from polyurethane or acrylic resins, and glass. In addition, while the various embodiments have particular utility for motor vehicles, other applications are contemplated such as use on surfaces associated with marine and aerospace environments, household uses (e.g., tub and shower enclosures), and for building maintenance (e.g., windows).

EXAMPLES

The various embodiments of the invention will be more fully appreciated with reference to the examples that follow.

Unless noted otherwise, all reagents mentioned in the examples were obtained or are available from Sigma-Aldrich Company, St. Louis, Mo., U.S.A., or may be synthesized by known methods. Unless reported otherwise, all amounts and ratios are by weight percent.

The following abbreviations are used in the examples and elsewhere in the detailed description:

° C.: degrees Centigrade
° F.: degrees Fahrenheit
cm: centimeters
$ft^2$: square foot
mil: $10^{-3}$ inches
ml: milliliters
mls/$m^2$: milliliters per square meter
mm: millimeters AR-1 (Acrylic Resin 1): A 45% by weight solution (in 90%/10% by weight VMP naphta/xylene) of a thermoplastic acrylic resin obtained under the trade designation "PARALOID B-67" from Dow Chemical Company, Midland, Mich., U.S.A.

AR-2 (Acrylic Resin 2): A 45% by weight solution (in mineral thinner) of a thermoplastic acrylic resin obtained under the trade designation "PARALOID B-67 MT" from Dow Chemical Company.

AR-3 (Acrylic Resin 3): An acrylic resin obtained under the trade designation "LUSTER SEAL 300" from The Euclid Chemical Company, Cleveland, Ohio, U.S.A.

HMDS: Hexamethyldisiloxane obtained from Chemsil Silicones, Inc., Chatsworth, Calif. under the trade designation VOLASIL DM-0.65.

SARS: A synthetic acid rain solution of 1% diatomaceous earth, obtained under the trade designation "CELITE SUPER FLOSS" from Celite Corporation, Lampoc, Calif., U.S.A., in 1 molar sulfuric acid.

RP/P-1 (Reactive Polyorganosiloxane or Precursor 1): A polydimethylsiloxane and high molecular weight silicone resin in solvent that includes tetra(trimethylsiloxy)silane and trimethylated silica, obtained under the trade designation "DOW CORNING 20 RELEASE COATING" from Dow Corning Corporation, Midland, Mich., U.S.A. RP/P-2 (Reactive Polyorganosiloxane or Precursor 2): A diamino-modified silicone fluid having a functional equivalent weight of 6,000 grams/mol obtained under the trade designation "KF-859" from Shin-Etsu Chemical Co., Ltd., Tokyo, Japan.

RP/P-3 (Reactive Polyorganosiloxane or Precursor 3): A diamino-modified silicone fluid having a functional equivalent weight of 7,600 grams/mol obtained under the trade designation "KF-860" from Shin-Etsu Chemical Co., Ltd.

RP/P-4 (Reactive Polyorganosiloxane or Precursor 4): An amino-modified silicone fluid having a functional equivalent weight of 2,200 grams/mol obtained under the trade designation "KF-8012" from Shin-Etsu Chemical Co., Ltd.

RP/P-5 (Reactive Polyorganosiloxane or Precursor 5): An amino-modified silicone fluid having a functional equivalent weight of 4,000 grams/mol obtained under the trade designation "SILICONE TEXTILE SOFTENER BASE KF-8704" from Shin-Etsu Chemical Co., Ltd.

RP/P-6 (Reactive Polyorganosiloxane or Precursor 6): γ-Aminopropyltrimethoxysilane obtained under the trade designation "SILQUEST A-1110 SILANE" from Momentive Performance Materials, Albany, N.Y., U.S.A.

SV-1 (Solvent 1): Isopropyl alcohol.
SV-2 (Solvent 2): Acetone.
SV-3 (Solvent 3): An isoparaffinic fluid obtained under the trade designation "ISOPAR M" from ExxonMobil Chemical Company, Houston, Tex., U.S.A.

General Preparation

Solvents and HMDS at 70° F.±5° F. (21.1° C.±2.8° C.) were charged in the following order—SV-1, SV-2, HMDS, and SV-3—into a 1-liter glass beaker under a blanket of nitrogen and covered with aluminum foil. The solution was stirred for 5 minutes by means of an air mixer, model number "IKA RW20D2M" obtained from IKA Works, Inc. Wilmington, N.C. Acrylic resin was then added and stirring continued for 5 minutes. Finally, reactive polyorganosiloxane or precursor was added, and mixing continued for another 5 minutes until a clear, colorless solution was obtained. The solution was then transferred to a sealed plastic bottle under nitrogen.

Examples 1-26

Examples 1-26 were prepared by following the General Preparation described above and with the types and amounts of solvent, HMDS, acrylic resin, and reactive polyorganosiloxane or precursor being varied according to Table 1.

TABLE 1

| | Composition | | | | | | | | | | | | |
|---|---|---|---|---|---|---|---|---|---|---|---|---|---|
| | Solvents | | | | Acrylic Resin | | | Reactive Polyorganosiloxane or Precursor | | | | | |
| Example | SV-1 | SV-2 | SV-3 | HMDS | AR-1 | AR-2 | AR-3 | RP/P-1 | RP/P-2 | RP/P-3 | RP/P-4 | RP/P-5 | RP/P-6 |
| 1 | 10.0 | 24.0 | 36.2 | 24.0 | 1.0 | 0.0 | 0.0 | 4.8 | 0.0 | 0.0 | 0.0 | 0.0 | 0.0 |
| 2 | 10.0 | 24.0 | 35.8 | 24.0 | 1.4 | 0.0 | 0.0 | 4.8 | 0.0 | 0.0 | 0.0 | 0.0 | 0.0 |
| 3 | 10.0 | 24.0 | 39.1 | 24.0 | 1.4 | 0.0 | 0.0 | 1.5 | 0.0 | 0.0 | 0.0 | 0.0 | 0.0 |
| 4 | 10.0 | 24.0 | 34.6 | 24.0 | 1.4 | 0.0 | 0.0 | 6.0 | 0.0 | 0.0 | 0.0 | 0.0 | 0.0 |
| 5 | 10.0 | 24.0 | 31.9 | 28.0 | 1.4 | 0.0 | 0.0 | 4.8 | 0.0 | 0.0 | 0.0 | 0.0 | 0.0 |
| 6 | 15.4 | 29.4 | 25.0 | 24.0 | 1.4 | 0.0 | 0.0 | 4.8 | 0.0 | 0.0 | 0.0 | 0.0 | 0.0 |
| 7 | 7.9 | 21.9 | 40.0 | 24.0 | 1.4 | 0.0 | 0.0 | 4.8 | 0.0 | 0.0 | 0.0 | 0.0 | 0.0 |
| 8 | 10.0 | 24.0 | 36.7 | 24.0 | 0.5 | 0.0 | 0.0 | 4.8 | 0.0 | 0.0 | 0.0 | 0.0 | 0.0 |
| 9 | 10.0 | 24.0 | 32.2 | 24.0 | 5.0 | 0.0 | 0.0 | 4.8 | 0.0 | 0.0 | 0.0 | 0.0 | 0.0 |
| 10 | 10.0 | 24.0 | 30.2 | 24.0 | 7.0 | 0.0 | 0.0 | 4.8 | 0.0 | 0.0 | 0.0 | 0.0 | 0.0 |
| 11 | 10.0 | 24.0 | 40.1 | 28.0 | 1.4 | 0.0 | 0.0 | 0.5 | 0.0 | 0.0 | 0.0 | 0.0 | 0.0 |
| 12 | 10.0 | 24.0 | 32.6 | 24.0 | 1.4 | 0.0 | 0.0 | 8.0 | 0.0 | 0.0 | 0.0 | 0.0 | 0.0 |
| 13 | 25.4 | 39.4 | 5.0 | 24.0 | 1.4 | 0.0 | 0.0 | 4.8 | 0.0 | 0.0 | 0.0 | 0.0 | 0.0 |
| 14 | 5.4 | 19.4 | 45.0 | 24.0 | 1.4 | 0.0 | 0.0 | 4.8 | 0.0 | 0.0 | 0.0 | 0.0 | 0.0 |
| 15 | 10.0 | 24.0 | 47.8 | 12.0 | 1.4 | 0.0 | 0.0 | 4.8 | 0.0 | 0.0 | 0.0 | 0.0 | 0.0 |
| 16 | 10.0 | 24.0 | 41.8 | 18.0 | 1.4 | 0.0 | 0.0 | 4.8 | 0.0 | 0.0 | 0.0 | 0.0 | 0.0 |
| 17 | 4.0 | 9.6 | 56.2 | 24.0 | 1.4 | 0.0 | 0.0 | 4.8 | 0.0 | 0.0 | 0.0 | 0.0 | 0.0 |
| 18 | 10.0 | 24.0 | 29.8 | 30.0 | 1.4 | 0.0 | 0.0 | 4.8 | 0.0 | 0.0 | 0.0 | 0.0 | 0.0 |

TABLE 1-continued

| | Composition | | | | | | | | | | | |
|---|---|---|---|---|---|---|---|---|---|---|---|---|
| | Solvents | | | | Acrylic Resin | | | Reactive Polyorganosiloxane or Precursor | | | | | |
| Example | SV-1 | SV-2 | SV-3 | HMDS | AR-1 | AR-2 | AR-3 | RP/P-1 | RP/P-2 | RP/P-3 | RP/P-4 | RP/P-5 | RP/P-6 |
| 19 | 20.0 | 48.0 | 1.8 | 24.0 | 1.4 | 0.0 | 0.0 | 4.8 | 0.0 | 0.0 | 0.0 | 0.0 | 0.0 |
| 20 | 25.0 | 60.0 | 0.0 | 8.8 | 1.4 | 0.0 | 0.0 | 4.8 | 0.0 | 0.0 | 0.0 | 0.0 | 0.0 |
| 21 | 10.0 | 24.0 | 35.8 | 24.0 | 1.4 | 0.0 | 0.0 | 0.0 | 4.8 | 0.0 | 0.0 | 0.0 | 0.0 |
| 22 | 10.0 | 24.0 | 35.8 | 24.0 | 1.4 | 0.0 | 0.0 | 0.0 | 0.0 | 4.8 | 0.0 | 0.0 | 0.0 |
| 23 | 10.0 | 24.0 | 35.8 | 24.0 | 1.4 | 0.0 | 0.0 | 0.0 | 0.0 | 0.0 | 4.8 | 0.0 | 0.0 |
| 24 | 10.0 | 24.0 | 35.1 | 24.0 | 0.0 | 0.0 | 2.1 | 4.8 | 0.0 | 0.0 | 0.0 | 0.0 | 0.0 |
| 25 | 10.0 | 24.0 | 35.8 | 24.0 | 0.0 | 1.4 | 0.0 | 4.8 | 0.0 | 0.0 | 0.0 | 0.0 | 0.0 |
| 26 | 10.0 | 24.0 | 34.7 | 24.0 | 2.4 | 0.0 | 0.0 | 0.0 | 0.0 | 0.0 | 0.0 | 4.8 | 0.1 |

The examples were subjected to one or more of the following tests, with the tests being conducted at least two times for each example. The results are reported in Table 2 as an average.

Application Test

A primed, painted, clear-coated, 18 by 24 inch by 32 mil (45.7 by 60.1 cm by 0.81 mm) cold-rolled steel test panel (simulating a conventional painted automobile panel) was obtained from ACT Laboratories, Inc., Hillsdale, Mich., U.S.A. Test sections of the panel, 4 by 4 inches (10.16 by 10.16 cm), were marked off using masking tape. Approximately 6 drops/ft$^2$ (65 drops/m$^2$) of the compositions of the examples were applied to the panel at 70° F.±5° F. (21.1° C.±2.8° C.), while horizontal, using a dry microfiber cloth with one composition being applied per test section. The compositions were evenly applied using circular, overlapping strokes. A rating of "1" was assigned if the composition dried in less than 3 minutes, a rating of "2" was assigned if the composition dried within the optimal time of 3-5 minutes, and a rating of "3" was assigned if the composition required more than 5 minutes to dry. After allowing the compositions to dry, the coated panel was evenly hand-buffed with another dry microfiber cloth and allowed to cure for 45-60 minutes.

Appearance Test

The extent to which the composition provided a clear, streak-free finish on the test panel following the Application Test (i.e., after being allowed to cure) was subjectively evaluated on a scale of 1-5 ("Poor," "Fair," "Moderate," "Good," and "Excellent," respectively), wherein "1" represents the presence of uneven and/or oily streaks or an opalescent appearance on the test panel and "5" represents a clear, streak-free, glass-like finish on the test panel.

Water Beading Test

A test panel prepared in accordance with the Application Test was sprayed with water. The extent to which the composition provided hydrophobicity was subjectively evaluated on a scale of 1-5, wherein "1" represents poor performance, as evidenced by large flat beads of water that wet out the surface of the test panel, and "5" represents excellent performance, as evidenced by numerous, small, well-rounded, hemispherical beads of water that did not wet out the surface of the test panel.

Water Release Test

A test panel prepared in accordance with the Application Test was positioned at a 60° angle (relative to the horizontal). Using a water dropper held at a height of 4 inches (10.16 cm) above the test panel, water was dripped onto the upper end of a 4 by 4 inch (10.16 by 10.16 cm) test section of the panel. The time taken for a water droplet to run off the test section of the panel was recorded and assigned a rating according to the following scale:

Rating 1=Droplet remained on the test section of the panel for more than 60 seconds;

Rating 2=Droplet ran off the test section of the panel in 16-60 seconds;

Rating 3=Droplet ran off the test section of the panel in 11-15 seconds;

Rating 4=Droplet ran off the test section of the panel in 6-10 seconds; and

Rating 5=Droplet ran off the test section of the panel in 5 seconds or less.

Durability Test

An automotive shampoo obtained under the trade designation "GOLD CLASSS CAR WASH SHAMPOO AND CONDITIONER" from Meguiar's, Inc., Irvine, Calif., U.S.A. was diluted to a 5% aqueous solution. A soft foam pad was saturated with the diluted shampoo solution and manually wiped in a back and forth motion across a test panel (prepared in accordance with the Application Test) for 25 cycles at 70° F.±5° F. (21.1° C.±2.8° C.). Each back-and-forth motion represented one cycle. The panel was then subjected to the Water Beading Test and the process was repeated until a rating of "1" on the Water Beading Test was achieved. A subjective durability rating of 1-5 was assigned accordingly:

Rating 1=Water Beading Test rating of 1 achieved in 25 cycles or less;

Rating 2=Water Beading Test rating of 1 achieved in 26-99 cycles;

Rating 3=Water Beading Test rating of 1 achieved in 100-199 cycles;

Rating 4=Water Beading Test rating of 1 achieved in 200-249 cycles; and

Rating 5=Water Beading Test rating of 1 still not achieved at 250 cycles.

TABLE 2

| Example | Application Test | Appearance Test | Water Release Test | Water Beading Test | Durability Test |
|---|---|---|---|---|---|
| 1 | 2 | 5 | 4 | 4 | 4 |
| 2 | 2 | 5 | 5 | 4.5 | 5 |
| 3 | 2 | 5 | 4 | 4 | 4 |
| 4 | 2 | 5 | 4 | 4 | 4 |
| 5 | 2 | 5 | 4 | 4 | 4 |
| 6 | 2 | 5 | 4 | 4 | 4 |
| 7 | 2 | 5 | 4 | 4 | 4 |
| 8 | 2 | 4 | NT | NT | 1 |
| 9 | 2 | 2 | 3 | 4 | 4 |
| 10 | 3 | 1 | NT | NT | NT |
| 11 | 2 | 4 | NT | NT | 1 |
| 12 | 3 | 1 | NT | NT | NT |
| 13 | 1 | 1 | NT | NT | NT |
| 14 | 3 | 1 | 1 | 1 | NT |

TABLE 2-continued

| Example | Application Test | Appearance Test | Water Release Test | Water Beading Test | Durability Test |
|---|---|---|---|---|---|
| 15 | 3 | 1 | NT | NT | NT |
| 16 | 2 | 3 | 3 | 3 | 3 |
| 17 | 3 | 1 | 1 | 2 | NT |
| 18 | 1 | 1 | 1 | 1 | NT |
| 19 | 1 | 1 | 1 | 2 | NT |
| 20 | 1 | 1 | 1 | 2 | NT |
| 21 | 2 | 5 | 3 | 4 | 4 |
| 22 | 2 | 5 | 5 | 4 | 4 |
| 23 | 2 | 5 | 5 | 4 | 4 |
| 24 | 2 | 5 | 1 | 4 | 4 |
| 25 | 2 | 5 | 4 | 4 | 4 |
| 26 | 2 | 5 | 1 | 4 | 4 |

NT = Not tested

A test panel prepared in accordance with the Application Test was divided into two test areas (instead of four test areas): an untreated test area; and a test area to which the composition of Example 2 was applied (the "treated" area). The test panel was placed horizontally, several drops of SARS were applied to the treated and untreated areas of the panel and allowed to remain on the panel for 72 hours at 70° F.±5° F. (21.1° C.±2.8° C.). The test panel was then rinsed with water and dried. The untreated area of the test panel that had been exposed to the SARS turned white, whereas no surface discoloration or etching was observed on the corresponding treated area of the test panel that had been exposed to the SARS.

A bare aluminum test panel, 26 by 19 cm by 1.5 mm thick, was wiped with isopropyl alcohol and allowed to dry. Approximately 6 drops/ft$^2$ (65 drops/m$^2$) of the composition of Example 2 were applied to one-half of the panel at 70° F.±5° F. (21.1° C.±2.8° C.) using a dry microfiber cloth. After allowing the composition to dry, the coated panel was evenly buffed with another dry microfiber cloth and allowed to cure for 45-60 minutes. The panel was then placed on a laboratory hot plate set at 842° F. (450° C.) for 20 minutes, after which it was removed and allowed to cool back to ambient temperature. The treated section remained clear and transparent with no evidence of decomposition or discoloration.

The composition of Example 2 was applied to a test panel prepared in accordance with the Application Test. The panel was subjected to 25 double-rubs (one double-rub is one back and forth manual wiping motion) with a microfiber cloth that had been wetted with 10% aqueous isopropyl alcohol according to the procedure of ASTM D5402-06 "STANDARD PRACTICE FOR ASSESSING THE SOLVENT RESISTANCE OF ORGANIC COATINGS USING SOLVENT RUBS." The panel was then subjected to the Water Release Test, dried, and the process repeated in 25 double-rub intervals eleven more times. After 300 double-rubs the panel maintained its water repellency as evidenced by a rating of "5" on the Water Release Test.

Illustrative embodiments of the protective coating compositions are discussed and reference has been made to possible variations. These and other variations, combinations, and modifications will be apparent to those skilled in the art without departing from the scope of the invention, and it should be understood that this invention is not limited to the illustrative embodiments set forth herein. Rather, the invention is limited only by the claims provided below, and equivalents thereof.

What is claimed is:

1. A protective coating composition comprising:

about 0.2 weight % to less than about 3.2 weight % of an acrylic resin, based on the weight of the composition;

a reactive polyorganosiloxane or precursor therefor;

hexamethyldisiloxane;

and a solvent system.

2. A protective coating composition according claim 1, wherein the acrylic resin comprises about 0.6 weight % to about 0.7 weight %, based on the weight of the composition.

3. A protective coating composition according to claim 1, wherein the acrylic resin is a polymer or copolymer of one or more (meth)acrylate monomers, the one or more (meth)acrylate monomers conforming to the structure:

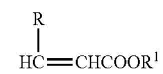

wherein R is H or —$CH_3$ and $R^1$ is a straight-chain or branched alkyl group having 1 to 6 carbon atoms.

4. A protective coating composition according to claim 1, wherein the composition includes a reactive polyorganosiloxane that is a polydimethylsiloxane wherein one or more of the —$CH_3$ moieties has been replaced by a side-group and/or an end-group that is or that includes an acrylo group, an amine group, an epoxy group, a hydroxyl group, a mercapto group, or a methacrylo group.

5. A protective coating composition according to claim 4, wherein the reactive polyorganosiloxane is a polydimethylsiloxane wherein one or more of the —$CH_3$ moieties has been replaced by a side-group and/or an end-group that is or that includes an amine group.

6. A protective coating composition according to claim 4, wherein the composition includes a precursor for a reactive polyorganosiloxane and the precursor is an alkoxy-silane that conforms to the general structure $$R^3—Si(OR^2)_3$$

wherein $R^2$ is —$CH_3$ or —$CH_2CH_3$ and $R^3$ is an alkyl group optionally containing acryloxy-, methacryloxy-, glycidoxy-, or amino- functionality.

7. A protective coating composition according to claim 4, wherein the composition includes a precursor for a reactive polyorganosiloxane and the precursor is a tetra(trialkylsiloxy)silanes that conforms to the general structure $$Si(OSi(R^4)_3)_3$$

wherein each $R^4$ is an alkyl radical that may be the same or different.

8. A protective coating composition according to claim 7, wherein the precursor for a reactive polyorganosiloxane is tetra(trimethylsiloxy)silane.

9. A protective coating composition according to claim 1, wherein the amount of reactive polyorganosiloxane or precursor therefor is at least about 0.005 weight %, based on the weight of the composition.

10. A protective coating composition according to claim 1, wherein the amount of reactive polyorganosiloxane or precursor therefor ranges from about 0.08 weight % to about 0.3 weight %, based on the weight of the composition.

11. A protective coating composition according to claim 1, wherein the amount of hexamethyldisiloxane ranges from about 18 weight % to about 28 weight %, based on the weight of the composition.

12. A protective coating composition according to claim 1, wherein the solvent system includes an isoparaffin solvent having a flashpoint of at least about 100° F.

13. A protective coating composition according to claim 1, wherein the solvent system includes an isoparaffin solvent that ranges from about 25 weight % to about 40 weight %, based on the weight of the composition.

14. A protective coating composition comprising:
about 0.5 weight % to about 2.3 weight %, based on the weight of the composition, of an acrylic resin that is a copolymer of two or more (meth)acrylate monomers that conform to the structure

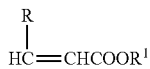

wherein R is H or CH$_3$ and R$^1$ is a straight-chain or branched alkyl group having 1 to 4 carbon atoms;
a reactive polyorganosiloxane or precursor therefor selected from the group consisting of amino-modified polydimethylsiloxanes, triethoxyoctylsilane, gamma-methacryloxypropyltrimethoxysilane, gamma-glycidoxypropyltrimethoxysilane, and gamma-aminopropyltriethoxysilane, and tetra(trimethylsiloxy)silane;
hexamethyldisiloxane; and
a solvent system that comprises an isoparaffin solvent having 9 to 13 carbon atoms and at least one other solvent selected from the group consisting of acetone, short, straight- and branch-chained alcohols, and dipropyleneglycol monopropylether.

15. A protective coating composition according to claim 14, wherein the amount of reactive polyorganosiloxane or precursor therefor is about 0.02 weight % to 0.3 weight %, based on the weight of the composition.

16. A protective coating composition according to claim 14, wherein the reactive polyorganosiloxane precursor is tetra(trimethylsiloxy)silane.

17. A protective coating composition according to claim 14, wherein the amount of hexamethyldisiloxane is about 18 weight % to 28 weight %, based on the weight of the composition.

18. A protective coating composition according to claim 14, wherein the amount of isoparaffin solvent is about 25 weight % to 40 weight %, based on the weight of the composition.

19. A protective coating composition according to claim 14, wherein the at least one other solvent is acetone and isopropyl alcohol.

20. A protective coating composition according to claim 14, further comprising trimethylated silica.

* * * * *

UNITED STATES PATENT AND TRADEMARK OFFICE
CERTIFICATE OF CORRECTION

| | | |
|---|---|---|
| PATENT NO. | : 8,829,092 B2 | Page 1 of 1 |
| APPLICATION NO. | : 13/813266 | |
| DATED | : September 9, 2014 | |
| INVENTOR(S) | : Nercissiantz et al. | |

It is certified that error appears in the above-identified patent and that said Letters Patent is hereby corrected as shown below:

In the specification

Column 2
Line 46, delete "up."These" and insert -- up." These --, therefor.

Column 4
Line 52, delete "may by" and insert -- may be --, therefor.

Column 12
Line 29, delete "CLASSS" and insert -- CLASS --, therefor.

In the claims

Column 14
Line 9, in Claim 2, delete "according" and insert -- according to --, therefor.

Column 15
Line 19, in Claim 14, delete "13 CH$_3$" and insert -- —CH$_3$ --, therefor.

Signed and Sealed this
Sixth Day of October, 2015

Michelle K. Lee
*Director of the United States Patent and Trademark Office*